: (12) United States Patent
Stratmann et al.

(10) Patent No.: US 12,508,516 B2
(45) Date of Patent: Dec. 30, 2025

(54) LOCKING UNIT FOR A PASSENGER RESTRAINT DEVICE, AMUSEMENT RIDE PASSENGER UNIT COMPRISING A PASSENGER RESTRAINT DEVICE AND A LOCKING UNIT, AND METHOD FOR FUNCTIONAL TESTING OF A LOCKING UNIT

(71) Applicant: HAWE Hydraulik SE, Aschheim (DE)

(72) Inventors: Eike Stratmann, Aschheim (DE); Alexander Ahle, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 708 days.

(21) Appl. No.: 17/934,890

(22) Filed: Sep. 23, 2022

(65) Prior Publication Data

US 2023/0095523 A1 Mar. 30, 2023

(30) Foreign Application Priority Data

Sep. 29, 2021 (DE) .......................... 102021210921.7

(51) Int. Cl.
*A63G 7/00* (2006.01)
(52) U.S. Cl.
CPC ...................................... *A63G 7/00* (2013.01)
(58) Field of Classification Search
CPC .............. A63G 7/00; B60R 2021/0097; B60R 2021/0206; B60R 2021/0213; B60R 2021/022; B60R 22/343
USPC .................................. 105/345, 149.1, 149.2
See application file for complete search history.

(56) References Cited

U.S. PATENT DOCUMENTS 5,015,933 A 5/1991 Watkins et al.
2021/0078528 A1\* 3/2021 Becherer ................. B60R 22/48

FOREIGN PATENT DOCUMENTS

| DE | 32 37 684 A1 | 4/1983 | |
|---|---|---|---|
| DE | 102017120645 A1 | 3/2019 | |
| DE | 102019216083 A1 | 4/2021 | |
| WO | 2018201011 A1 | 11/2018 | |
| WO | 2019126074 A1 | 6/2019 | |
| WO | WO-2019229183 A1 \* | 12/2019 | ............... A63G 7/00 |

OTHER PUBLICATIONS

Examination Report for DE 10 2021 210 921.7 dated May 30, 2022, 8 pages.

\* cited by examiner

*Primary Examiner* — S. Joseph Morano
*Assistant Examiner* — Heaven R Buffington
(74) *Attorney, Agent, or Firm* — Dinsmore & Shohl LLP

(57) ABSTRACT

A locking unit for a passenger restraint device of an amusement ride passenger unit has a cylinder-piston unit with a piston rod, a hydraulic accumulator and an electronic unit. The electronic unit has a sensor unit for monitoring the position of the piston rod. The electronic unit can be switched to a first measuring mode, wherein the piston rod is at least partially retracted. In the first measuring mode, the electronic unit detects actual positions of the piston rod over a first reference period by means of the sensor unit and compares them with a first limit position range stored in the electronic unit, the electronic unit generating a warning signal in the event of a deviation between the actual positions and the first limit position range. Furthermore, an amusement ride passenger unit includes such a locking unit and a method allows for functional testing of such a locking unit.

20 Claims, 5 Drawing Sheets

LOCKING UNIT FOR A PASSENGER RESTRAINT DEVICE, AMUSEMENT RIDE PASSENGER UNIT COMPRISING A PASSENGER RESTRAINT DEVICE AND A LOCKING UNIT, AND METHOD FOR FUNCTIONAL TESTING OF A LOCKING UNIT

CROSS-REFERENCE TO RELATED APPLICATIONS

This application claims priority to German Application 10 2021 210 921.7, filed Sep. 29, 2021, which is hereby incorporated by reference in its entirety.

FIELD OF THE INVENTION

The present invention relates to an locking unit for a passenger restraint device, an amusement ride passenger unit comprising a passenger restraint device and an locking unit, and a method for functional testing of an locking unit.

BACKGROUND OF THE INVENTION

Passenger restraint devices are provided for safety reasons on amusement rides where very considerable forces or accelerations are exerted on the passengers. These passenger restraint devices fix the passengers to the passenger receiving area in such a way that they cannot leave the passenger receiving area (seat, reclining area, standing area, etc.). Depending on the individual amusement ride, the passenger restraint device may also impose further restrictions on the freedom of movement of the passenger concerned. Such amusement ride passaging units and passenger restraint devices are known, for example, from DE 32 37 684 A1 or DE 10 2019 216 083 A1.

Common restraint elements are, for example, restraining bars which fix the passenger, for example, at the shoulders, chest, back, abdomen, hips and/or legs. Such restraining bars or other restraint elements can, in particular, be pivotably attached to the structure of the passenger unit, which also includes the passenger receiving area, in such a way that they can be locked in several different positions to adapt to the individual body size of the passenger concerned.

Conventional locking systems used here are ratchets or comparable mechanical locking gears. In the case of hydraulic locking elements, which are also already in use, the locking function is typically based on hydraulic fluid being sealed in a hydraulic cylinder working chamber whose volume changes with the position of the restraint element or piston rod. This allows the locking of the restraint element to be infinitely variable in different positions. The hydraulic cylinder is part of a locking unit which has a further function in addition to the locking function for the restraint element. It is suitable and designed to actively open the restraint element after it has been unlocked. In this way, the restraining bars or other restraint elements in all passenger units of the ride can be opened simultaneously and without passenger intervention by the associated hydraulic adjusters, thus enabling passengers to change quickly and smoothly. For this purpose, the hydraulic adjuster has, in addition to the then typically double-acting hydraulic cylinder, a hydraulic accumulator and an electronic unit with a sensor unit. The hydraulic accumulator stores hydraulic fluid under pressure and is charged by hydraulic fluid displaced from the hydraulic cylinder when the restraint element is closed. Depending on a valve switching position, the hydraulic cylinder is pressurized via the hydraulic accumulator with reverse flow direction in the sense of opening the restraint element. To ensure that the restraint element is closed or open, the position of the piston rod is monitored via the sensor unit. In this way, possible safety risks can be minimized even before the amusement ride starts moving.

With these locking units, secure fixing of the restraint element in the desired closed position is essential for safety reasons. Even minor leakage could cause the restraint element to open slightly over time, resulting in dangerous situations for passengers while the amusement ride is in motion.

For this reason, the locking units are tested at regular intervals, usually several times a week, to ensure that they are functioning properly. For this purpose, a mechanic installs a test device between the passenger receiving area and the restraint element and tests the sealing capacity of the locking unit. If one of the locking units does not exhibit the required sealing capacity over the test period during this functional test, it must be replaced in order to minimize the risk of accidents.

This type of testing is extremely reliable and has proven itself over the years. However, this functional test is time-consuming and cost-intensive. On the one hand, appropriate testing equipment must be kept available. Secondly, a test must be carried out for each locking unit of a ride. Since some modern amusement rides can accommodate up to 30 passengers, an assumed test period of 10 minutes per locking unit (installation of the test device, testing, removal of the test device) and two locking units per passenger receiving area means that a total test time of ten hours can be expected. Of course, the total test time can be minimized by using several test devices and mechanics, although this is then associated with correspondingly higher costs.

SUMMARY OF THE INVENTION

Therefore, it is the objective of the present invention to provide an locking unit for a passenger restraint device, with which the functional test can be carried out more quickly and more cost-effectively. Furthermore, it is also the objective of the present invention to provide a corresponding method for functional testing of a locking unit.

The solution of the task is achieved with a locking unit as disclosed herein and as a method for functional testing of the locking unit as disclosed herein. Preferably further embodiments are also described.

The locking unit according to the invention is characterized over the locking units known from the prior art in particular in that the electronic unit is configured to be switched to a first measuring mode. According to the invention, the piston rod is in a first defined reference position in the first measuring mode and the electronic unit is configured to detect actual positions of the piston rod over a first reference period in the first measuring mode by means of the sensor unit. The detected actual positions are compared with a first limit position range stored in the electronic unit, with the electronic unit being configured to generate a warning signal in the event of a deviation between the actual positions and the first limit position range. For the purposes of the invention, an actual position is understood to be the pure movement of the piston rod in mm/s.

In other words, the electronic unit of the locking unit is switched to the first measuring mode for the function test and the retaining element is moved to the defined reference position. Over a reference period, the actual positions and thus the speed of the piston rod are monitored, preferably permanently. If the locking unit has sufficient sealing capacity because the detected actual positions are within the specification according to the first limit position range, an unintentional at least partial opening of the restraint element can be excluded. The first reference period and the first limit position range are matched to each other in such a way that tolerable movements of the piston rod do not cause a warning signal.

This has the advantage that only the restraint element has to be moved to the defined reference position. No test device has to be installed and uninstalled at great expense. Several locking units can also be checked in parallel, which minimizes the overall costs and time required for functional testing.

Preferably, the electronic unit is configured to be selectively switched to a second measuring mode, wherein the piston rod is in a second defined reference position in the second measuring mode. According to the invention, the electronic unit in the second measuring mode is configured to detect actual positions of the piston rod over a second reference period by means of the sensor unit and configured to compare them with a second limit position range stored in the electronic unit. The electronic unit is configured to generate a warning signal in the event of a deviation between the actual positions and the second limit position range. The second reference period differs from the first reference period. Alternatively or additionally, the second limit position range differs from the first limit position range. In this context, it is preferable if the first reference period is shorter than the second reference period. Furthermore, it is preferable if the second limit position range is smaller than the first limit position range. Preferably, the second defined reference position corresponds to the first defined reference position.

Different function test scenarios can be chosen by selecting the first or second measurement mode, for example a quick measurement for daily testing or regular testing before starting a ride and a maintenance measurement for more precise function testing at intervals of several days. In the maintenance measurement, the movement of the piston rod is monitored over a longer period of time. It is conceivable, for example, that a somewhat greater movement is tolerated before the start of the ride and after the restraint element is closed, since passengers regularly exert an additional force on the restraint element, which in turn leads to movements and higher speeds of the piston rod. Furthermore, in the case of the quick measurement, the reference period is significantly shorter, so that larger movements of the piston rod can be tolerated. The maintenance measurement is regularly carried out without passengers, so that only possible leakages in the locking unit or environmental influences lead to a movement of the piston rod. In this respect, the (preferably second) limit position range can be defined more strictly for the maintenance measurement than for the quick measurement.

In this context, it is conceivable that the quick measurement is carried out automatically from a selected event before the start of the ride, for example after the restraint element is closed. Preferably, the generation of the warning signal blocks the start of the ride so that departure cannot take place in the event of a negative result of the function test.

Preferably, the first defined reference position and/or the second defined reference position corresponds to a minimum closing position of the passenger restraint. This allows the actual positions of the piston rod to be recorded over the theoretically largest possible range of movement of the piston rod. The piston rod is thus moved to a reference point, which corresponds to the closing position of the restraint element for the maximum passenger.

Preferably, the electronic unit comprises a memory, wherein the electronic unit is configured to at least partially detect actual positions of the piston rod by means of the sensor unit and to store them in the memory. Preferably, the locking unit has a data interface for reading out the memory. The memory is preferably a non-volatile memory.

The stored data can be used to compare the wear of one locking unit with the wear of other locking units and to evaluate the occupancy of the amusement ride. For example, based on this data, a locking unit of a particularly frequently used passenger receiving area can be exchanged after a certain time with a locking unit of a significantly less frequently used passenger receiving area in order to achieve a more homogeneous wear overall.

Preferably, the electronic unit comprises an interface for connection to a ride control system. In particular, the electronic unit is thus configured thus be switched centrally between the first and second measuring modes.

Further, the problem is solved with an amusement ride passenger unit as disclosed herein. According to the invention, the amusement ride passenger unit comprises a passenger restraint device and a locking unit described above, wherein the piston rod of the locking unit is connected to the passenger restraint device.

According to the invention, a method for functional testing of a locking unit described above is also provided. The method comprises the following steps: moving the piston rod to a first or second defined reference position; switching the electronic unit to the first or second measuring mode; collecting or the actual positions over the first reference period in the first measuring mode or over the second reference period in the second measuring mode; comparing the actual positions with the first limit position range in the first measuring mode or the second limit position range in the second measuring mode; outputting the warning signal if the actual positions deviate from the first limit position range in the first measuring mode or from the second limit position range in the second measuring mode.

Preferably, before moving to the first defined reference position or to the second defined reference position, the piston rod is moved to a position corresponding to a fully open passenger restraint device, with the actual positions of the piston rod being detected by the electronic unit. In this way, the accumulator preload can be checked. It is conceivable that a warning signal is output by the electronic unit if the piston rod cannot be moved to a position corresponding to a fully open passenger restraint device.

Preferably, a go signal is output by the electronic unit when the actual positions in the first measuring mode are within the first limit position range or when the actual positions in the second measuring mode are within the second limit position range. This ensures that the functional testing of the locking unit is positive and that the ride operator can save time and increase the safety level through this level of automation.

BRIEF DESCRIPTION OF THE DRAWINGS

The invention is explained in more detail below with reference to an example of an embodiment shown in the figures, wherein schematically.

DETAILED DESCRIPTION OF THE INVENTION

Figure 1:
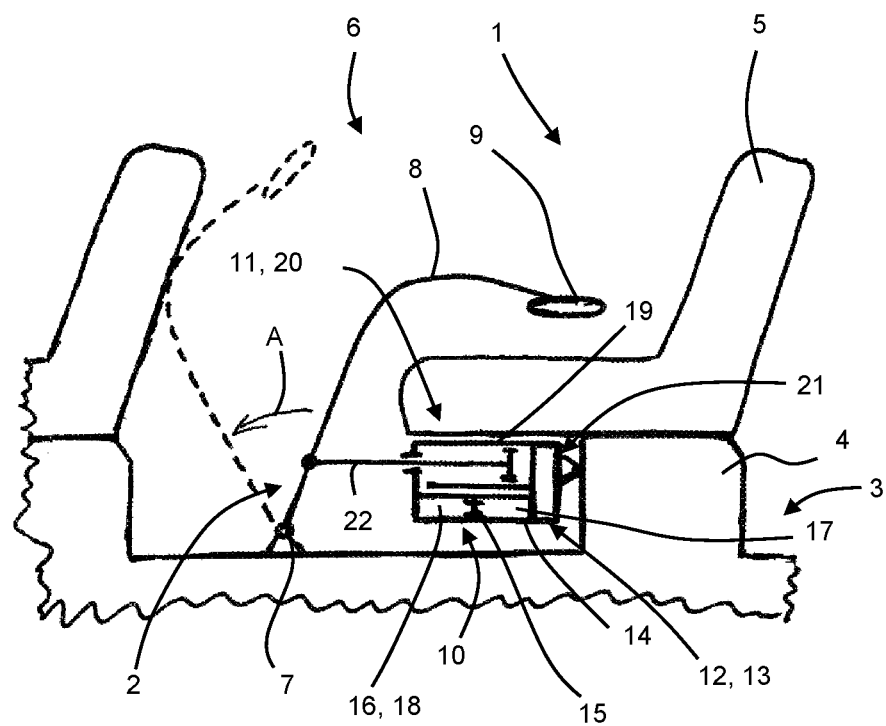
FIG. 1 is a principle illustration of an amusement ride passenger unit according to the present invention.

The amusement ride passenger unit schematically displayed in FIG. 1 comprises a passenger receiving area 1 and a passenger restraint device 2. The passenger receiving area 1 is configured as a seat 5 mounted on a base structure 3 of the amusement ride, namely on a seat support 4. The passenger restraint device 2 comprises a position-adjustable restraint element 6 in the form of a restraining bar 8 pivotably mounted on a joint 7 (cf. arrow A) on the base structure 3 of the amusement ride, with a padded pressure plate 9, by means of which a passenger sitting on the seat 5 is fixed on the seat 5 by the thighs near the hips.

A lockable locking unit 10 acts on the restraining bar 8. The locking unit 10 comprises a cylinder-piston unit 11 and a hydraulic accumulator 12. The hydraulic accumulator 12 is configured as a unit in the form of a spring-piston accumulator 13. It comprises a cylinder 14 with a free piston 15 guided therein in a sealing manner, which separates a spring chamber 16 from a hydraulic chamber 17 within the cylinder 14, the spring in this embodiment being configured as a gas spring and the spring chamber 16 is thus configured as a gas chamber 18. Next to the cylinder 14 of the spring-piston accumulator 13 and parallel to it is a cylinder 19 of the cylinder-piston unit 11 configured as a differential cylinder 20. The spring-piston accumulator 13 and the cylinder-piston unit 11 form a structural unit in that the cylinder 19 of the cylinder-piston unit 11 and the cylinder 14 of the spring-piston accumulator 13 are part of an integrated cylinder assembly 21. The piston rod 22 of the cylinder-piston unit 11 is hinged to the restraining bar 8. Opposite, the cylinder assembly 21 is hinged to the seat support 4.

The end of the spring chamber 16 is sealed gas-tight with a special closure, even against the high gas pressures prevailing there. For this purpose, the closure has a filling port 77 for filling the spring chamber 16 (or the gas chamber 18) with spring gas. The filling port 77 (cf. FIG. 2) is characterized by a two-stage seal. A check valve 79, to which an insert 81 pressed into a filling port 80 and which is only partially illustrated, forms a primary sealing element 82. A secondary sealing element 83 is formed by a screw plug 84. The function of the locking unit 10 benefits from the particularly reliable sealing provided in this way; this is because the precise setting of the pilot gas pressure in the spring chamber 16 (and the maintenance of the set pilot gas pressure) is a decisive factor in matching the locking unit 10 to the particular application. A filling port comparable to that on the gas side is provided on the oil side 85, not shown in detail in FIG. 2.

Figure 2:
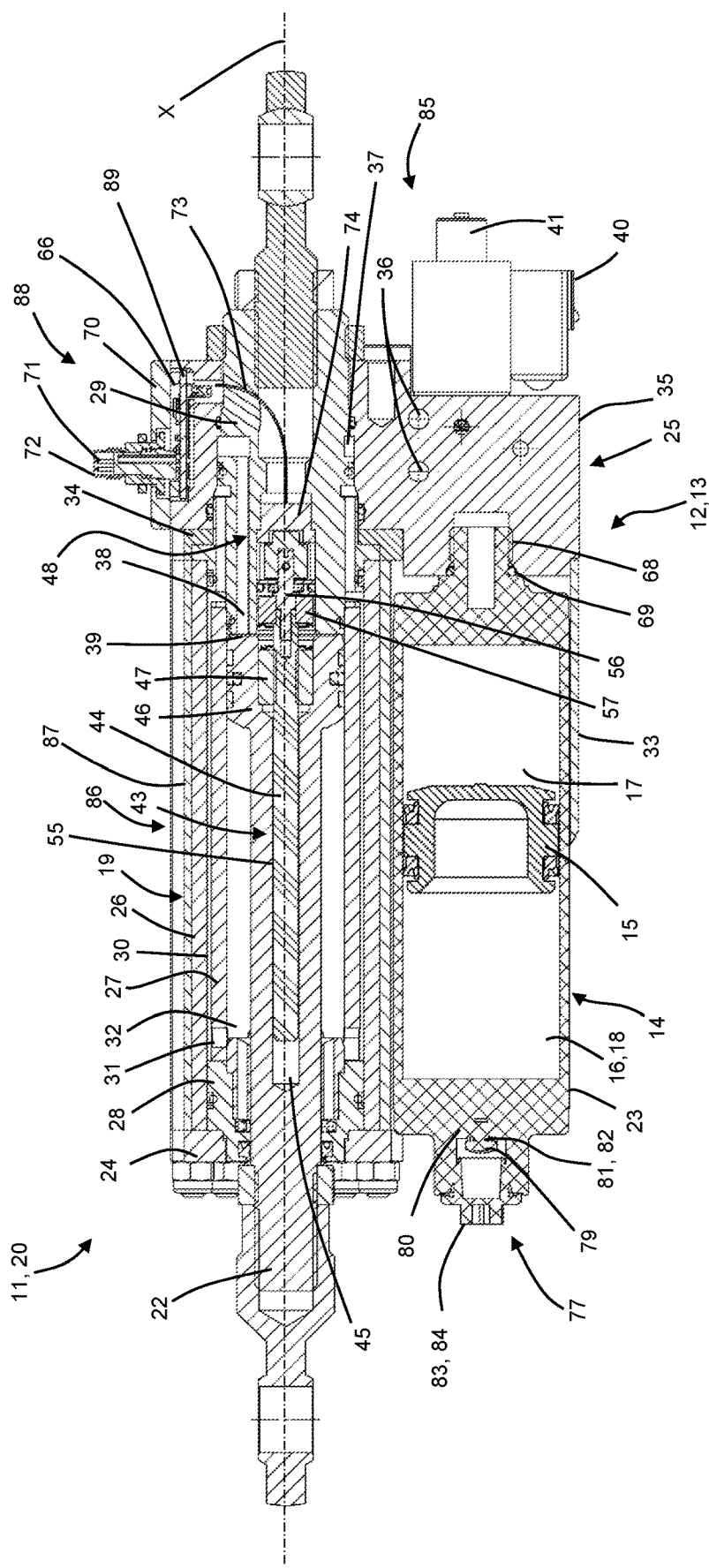
FIG. 2 is a cross-sectional view through a locking unit according to the invention.

Details of the cylinder assembly 21 are shown in FIG. 2. Thus, the cylinder 14 of the spring-piston accumulator 13 is composed by a cylinder housing 23 which is detachably arranged on a switch plate 35 of a connection block 25. As shown, the cylinder housing 23 is releasably disposed on the switch plate 35 via a threading 68 and a seal 69 so that the entire hydraulic accumulator 12 can be secured to or removed from the switch plate 35 as a single unit. The cylinder assembly 21 further includes a section of extruded double tubular profile 86. Further, the cylinder housing 23 is guided in a tubular section 33 of the extruded double tubular profile 86 which radially surrounds the cylinder housing 23. A connection block 25 also extends across one end face of the cylinder 19 of the cylinder-piston unit 11. The cylinder 19 of the cylinder-piston unit 11 is partially formed by a further tube section 87 of the double tube profile 86 and is further of double tube construction with an outer tube 26 and an inner tube 27, a head portion 28 and a bottom portion 29, wherein an annular space 30 exists between the inner tube 27 and the outer tube 26 which communicates via bores 31 of the inner tube 27 with a piston rod working space 32 of the cylinder 19 defined via a piston 46 of the piston rod 22. Further, a sealing cap 24 is provided on the side of the head portion 28.

The connection block 25, which comprises the switch plate 35, further comprises a closure plate 34. The cylinder 19 of the cylinder-piston unit 11 is clamped between the sealing cap 24 and the connection plate 34. The corresponding assembly is tensed via corresponding tie rods.

The switch plate 35 has an integrated line and valve arrangement hydraulically connecting the hydraulic chamber 17 of the hydraulic accumulator 12 with the cylinder-piston unit 11. The channels 36 of the line and valve arrangement communicate via corresponding transfers 37 with channels 38 provided in the bottom portion 29 penetrating the switch plate 35, which open into the piston working chamber 39 or annular chamber 30 separated from the piston rod working chamber 32 by the piston 46. The switch plate 35 also has an electrical switching interface 40, via which it is possible to control the switching solenoids 41 of the switching valves integrated in the line and valve arrangement.

Furthermore, the cylinder-piston unit 11 comprises an electronic unit 88 with a sensor unit 42 configured as a piston position sensor. The piston position sensor 42 comprises a spindle 43, which extends parallel to the cylinder axis X, and which is mounted so as to be axially fixed in rotation relative to the cylinder 19 and which comprises a threaded section 44 with a steep thread, which penetrates into a cavity 45 of the piston 46 or the piston rod 22. The threaded section 44 interacts with a corresponding spindle nut 47 disposed on the piston 46 in such a way that a linear movement of the piston rod 22 or of the piston 46 along the cylinder axis X is converted into a rotation of the spindle 43 about its axis. For detecting this spindle rotation, a transducer 48 is disposed in the cylinder 19, namely in its bottom portion 29. The signal provided by the transducer 48, which is configured as a contactless rotation transducer, is switched to an electrical control interface connected to it in the sense of actual positions of the piston rod 22 or piston 46. An electronic evaluation circuit 89 is connected to the control interface, as will be described in more detail below.

In this embodiment, the spindle nut 47 is completely received in a bore of the piston 46 and is secured there by means of a serrated ring 54. The spindle 43 is configured in two parts. It comprises a main part 55, on the surface of which the steep thread is provided, and an end piece 56 screwed to the main part 55. Regarding the bearing of the spindle 43, an inner ring (not shown) of a rolling bearing 57 is fixed to the spindle 43 in a transition region from the main part 55 to the end piece 56. As shown, the inner ring of the rolling bearing 57 is clamped between a first shoulder 58 provided on the main part 55 and a second shoulder 59 provided on the end piece 56. With regard to the precise, backlash-free support of the spindle 43 both in the axial and in the radial direction, the rolling bearing 57 is thereby configured as a double-row ball bearing running under oil.

Figure 4:
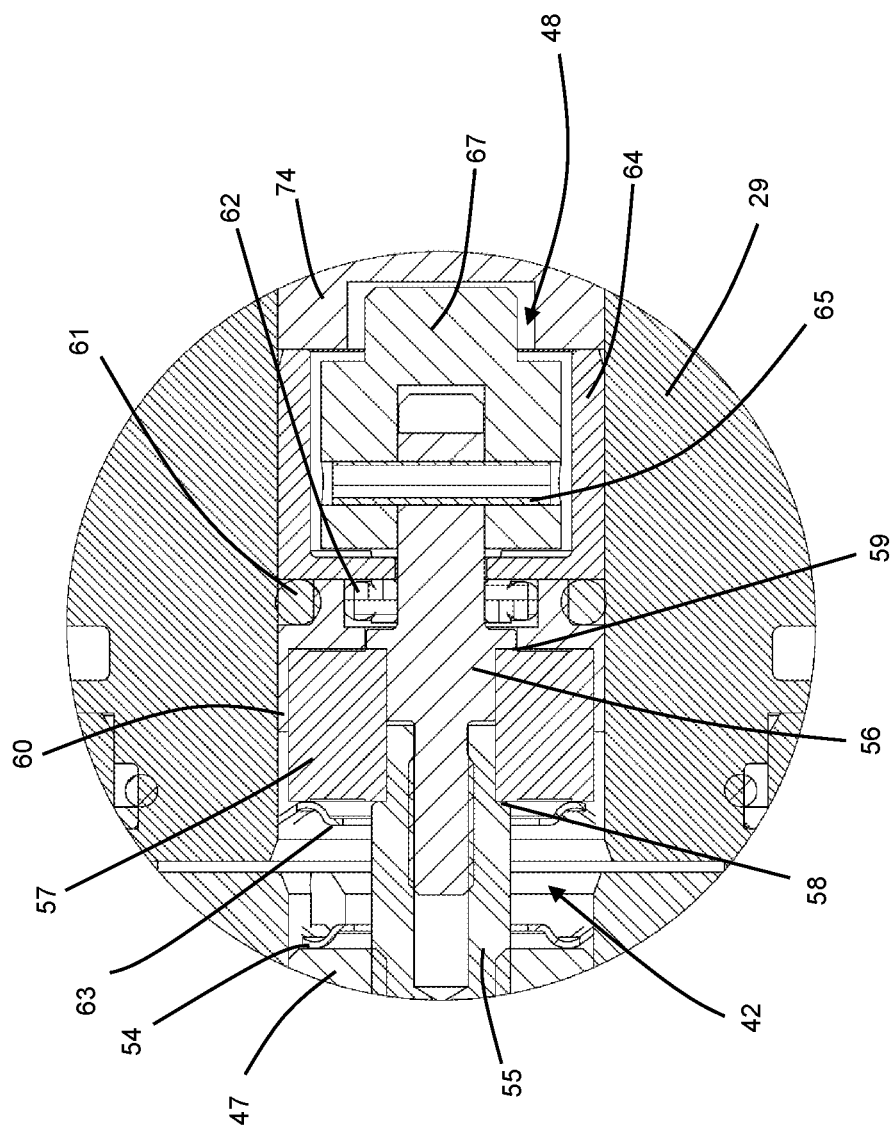
FIG. 4 is an enlarged detail view of FIG. 2.

Its outer ring (also not shown) is supported in a bearing insert 60, which in turn is inserted in a bore of the bottom portion 29 and sealed off from the latter by means of a sealing ring 61. With respect to the end piece 56 of the spindle 43, the bearing insert 60 is sealed by means of a sealing ring 62. The composite of rolling bearing 57 and bearing insert 60 is clamped against a bushing 64 by means of a serrated ring 63, which in turn fixes a stationary part or sensor 74 respectively of the transducer 48, cf. also FIG. 4.

A rotary member 67 of the transducer (contactless rotation transducer) 48 is fixed on the portion of the end piece 56 passing through the bushing 64. As shown, the rotary member 67 is secured by a pin 65 extending through the bushing 64 and the rotary member 67.

As shown in FIG. 2, the electronic evaluation circuit 89 comprises a memory and is supported in a receiving space 66 of the circuit board 35. An interface 72 provided as a contact socket 71 is attached to the cover 70 closing this space. The interface 72 is connected to a (not shown) higher-level controller of the amusement ride. Furthermore, the memory can also be read out via the interface 72. However, it is also conceivable that the memory can be read out via a separate interface, for example an NFC interface. The electronic evaluation circuit 89 is connected to the stationary part 74 of the transducer 48 via a signal line 73.

Figure 3:
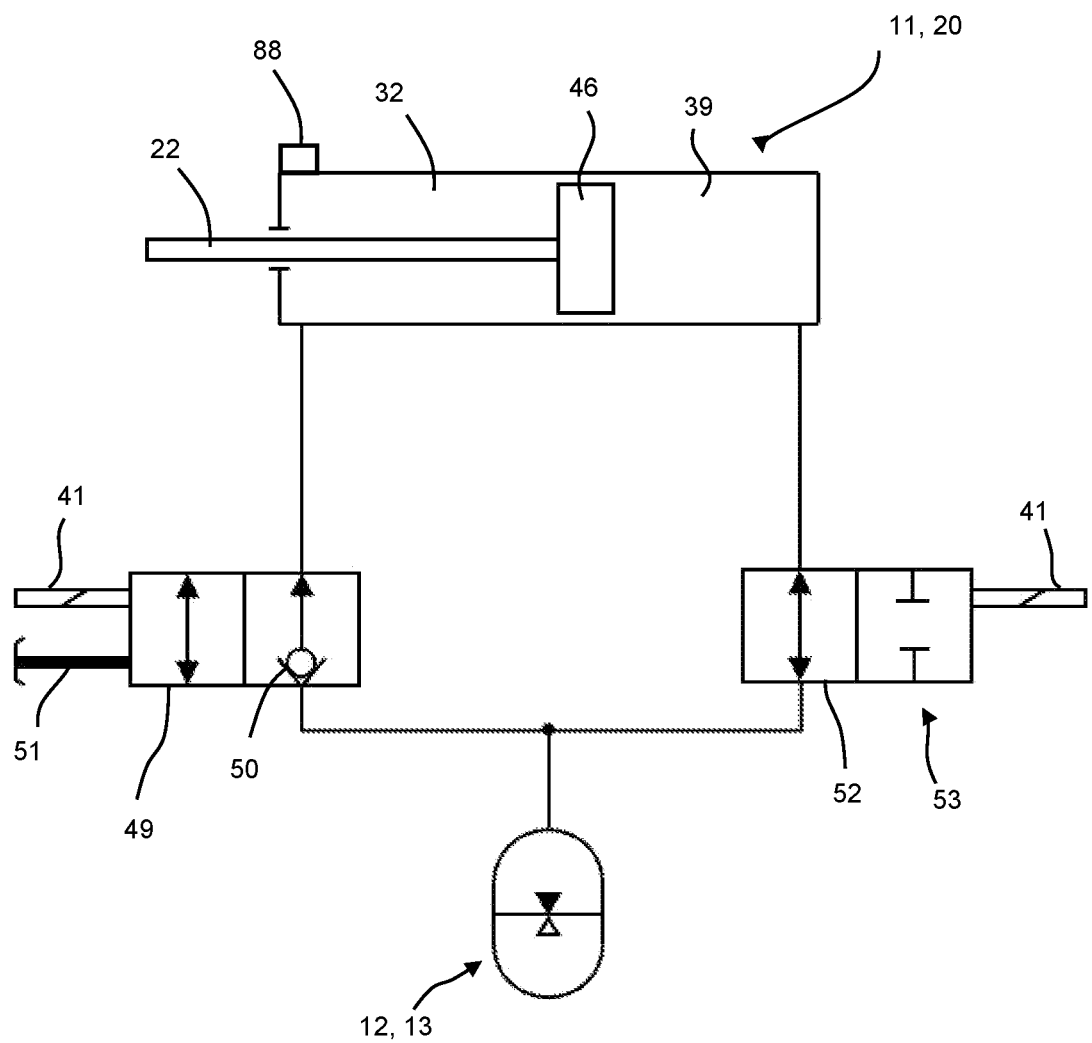
FIG. 3 is a hydraulic circuit diagram for the locking unit according to FIG. 2.

As shown in the hydraulic circuit diagram according to FIG. 3, a switching valve 49 configured as a 2/2—valve is fluidically arranged between the hydraulic accumulator 12 and the piston rod working chamber 32. Without actuation of the associated switching solenoid 41, the switching valve 49 assumes the safety position illustrated in FIG. 3, in which a check valve 50 permits a flow from the piston working chamber 39 of the differential cylinder 20 to its piston rod working chamber 32, but prevents it in the opposite direction. In this safety position, therefore, the restraining bar 8 can be moved closer to the seat 5 but not further away from it. By applying pressure to the switching solenoid 41 associated with the switching valve 49—and in an emergency also by manual actuation of a trigger 51—the switching valve 49 can be switched to its second position. In this position, there is an unlocked floating position in which both the piston working chamber 39 and the piston rod working chamber 32 of the differential cylinder 20 are pressurized by the hydraulic accumulator 12 via the line and valve arrangement. In this floating position, in the absence of external forces, the restraining bar 8 is acted upon by a force opening it. In the floating position, however, the restraining bar 8 can be moved manually towards its closed position against the relevant opening force.

The line and valve arrangement further comprises a second switching valve 52, also configured as a 2/2—valve and in turn actuable by means of an associated switching solenoid 41, which forms a blocking valve arrangement 53 by means of which—when the relevant switching solenoid is acted upon—hydraulic fluid can be locked in the differential cylinder 20, whereby the differential cylinder 20 is blocked, i.e. the position of the piston rod 22 is fixed. The resulting fixation of the restraining bar 8 in its position, in particular in its fully open position, allows the restraining bar 8 to serve as an entry aid.

Figure 5:
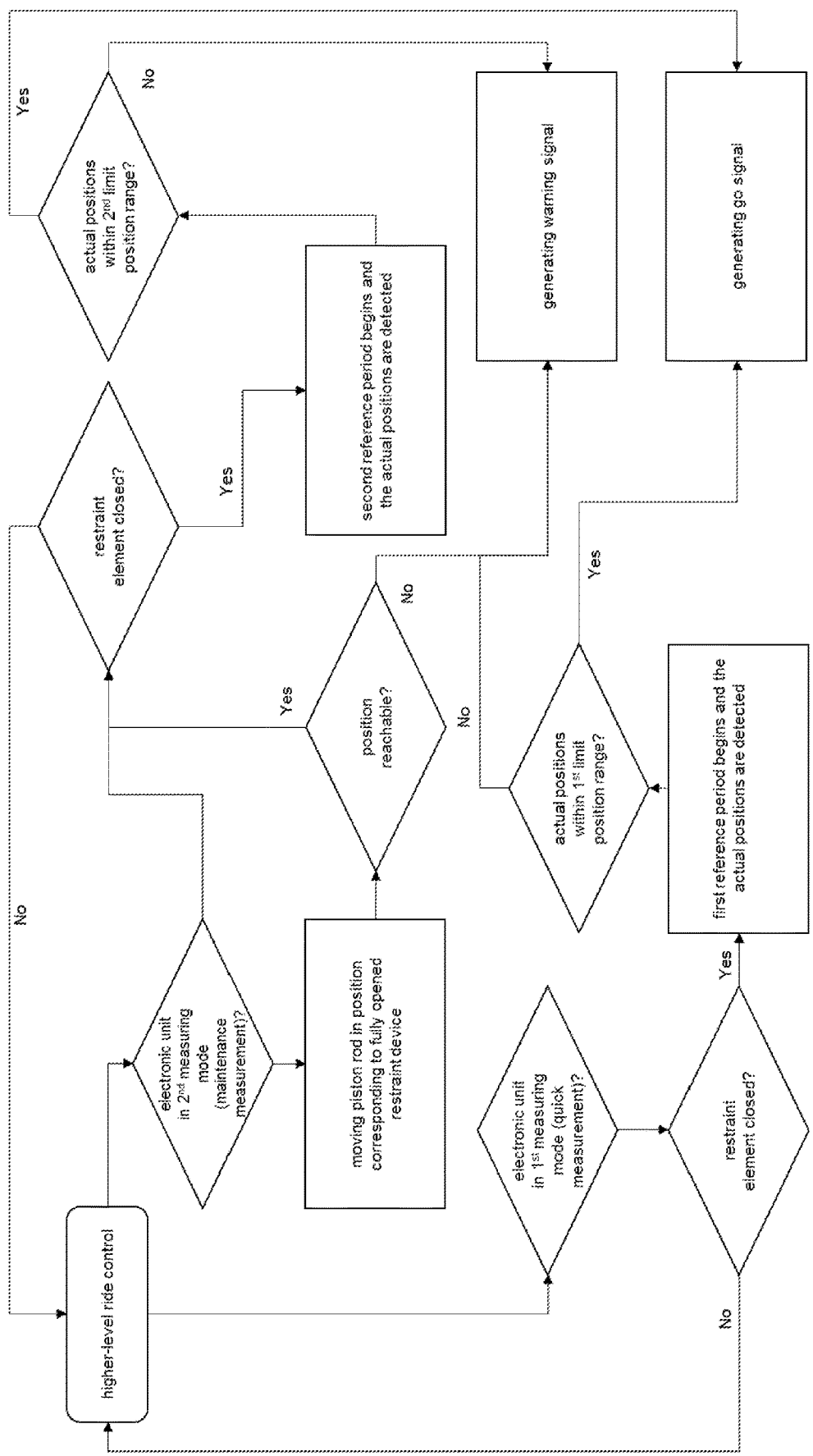
FIG. 5 is a flow chart for a method of testing the functional reliability of the locking unit according to the invention.

The various modes of the electronic unit 88 are now described in more detail below with reference to FIG. 5.

The electronic unit 88 can be switched to either a first or a second measuring mode via the higher-level ride control system. During the normal ride of the amusement ride, a type of operating mode is activated and the actual positions of the piston rod 22 determined by the piston position sensor 42 at standstill are stored in the memory in a resolution that can be freely defined in advance. This data can be used, for example, to evaluate the sealing capacity of the locking unit 10 and to detect creeping wear.

In addition, the data stored in the memory on the actual position of the piston rod 22 can also be used to evaluate the occupancy of the ride. For example, based on this data, a locking unit 10 of a particularly frequently used passenger seat 1 can be exchanged after a certain time with a locking unit 10 of a significantly less frequently used passenger seat 1 in order to achieve a more homogeneous wear overall.

When the electronic unit 88 is switched to the first measuring mode by the higher-level ride control system, it is first checked whether the restraint element 6 is closed or whether the piston rod 22 is in a predefined position. Only if the piston rod 22 is correspondingly in the first defined reference position, the first reference period starts and the actual positions of the piston rod 22 are detected by means of the piston position sensor 42. In this exemplary embodiment, the first defined reference position corresponds to the minimum closing position of the passenger restraint device 2 or the restraint element 6. As soon as the first reference period has elapsed, the electronic unit 88 compares the detected actual positions with the first limit position range. If all detected actual positions are within the first limit position range, it is assumed that the locking unit 10 is sufficiently tight and a go signal is output to the higher-level ride control system. It should be noted that both the first reference period and the first limit position range are generally freely definable. Furthermore, the first measurement mode can also be defined in the sense of a quick measurement in such a way that it is carried out automatically at regular intervals before the ride starts.

Accordingly, the electronic unit 88 can be switched by the higher-level ride control system to the second measuring mode in the sense of a maintenance measurement, whereby it is also first checked whether the restraint element 6 is closed or the piston rod 22 is in a predefined position. Only if the piston rod 22 is correspondingly in the second defined reference position, the second reference period begins and the actual positions of the piston rod 22 are detected by means of the piston position sensor 42. In this exemplary embodiment, the second defined reference position is identical to the first defined reference position and corresponds to the minimum closing position of the passenger restraint device 2 or the restraint element 6. As soon as the second reference period has elapsed, the electronic unit 88 compares the detected actual positions with the second limit position range. If all detected actual positions are within the second limit position range, it can be assumed that the locking unit 10 is sufficiently tight and a go signal is output to the higher-level ride control system. Also for the second measuring mode, both the second reference period and the second limit position range can be freely defined. Furthermore, it is conceivable that the piston rod 22 is moved in advance to a position corresponding to a fully opened passenger restraint device 2, whereby the actual positions of the piston rod 22 are detected. If this position is not reached, the electronic unit 88 emits a warning signal, which allows conclusions to be drawn, for example, about an insufficient preload of the hydraulic accumulator 12.

The difference between the first measurement mode (quick measurement) and the second measurement mode (maintenance measurement) is that the movement of the piston rod 22 in the maintenance measurement is expediently monitored over a longer period of time. The maintenance measurement is regularly carried out without passengers, so that only possible leakages in the locking unit 10 or environmental influences lead to a movement of the piston rod 22. In this respect, the second limit position range is regularly more strictly defined for maintenance measurement than for quick measurement.

LIST OF REFERENCE SIGNS 1 passenger receiving area
2 passenger restraint device
3 base structure
4 seat support
5 seat
6 restraint element
7 joint
8 restraining bar
9 pressure plate
10 locking unit
11 cylinder-piston unit
12 hydraulic accumulator
13 spring-piston accumulator
14 cylinder
15 free piston
16 spring chamber
17 hydraulic chamber
18 gas chamber
19 cylinder
20 differential cylinder
21 cylinder assembly
22 piston rod
23 cylinder housing
24 sealing cap
25 connection block
26 outer tube
27 inner tube
28 head portion
29 bottom portion
30 annular space
31 bore
32 piston rod working space
33 tubular section
34 closure plate
35 switch plate
36 channel
37 transfer
38 channel
39 piston working chamber
40 switching interface
41 switching solenoids
42 sensor unit/piston position sensor
43 spindle
44 threaded section
45 cavity
46 piston
47 spindle nut
48 transducer
49 switching valve
50 check valve
51 trigger
52 switching valve
53 blocking valve assembly
54 serrated ring
55 main part
56 end piece
57 rolling bearing
58 first shoulder
59 second shoulder
60 bearing insert
61 sealing ring
62 sealing ring
63 serrated ring
64 Bushing
65 pin
66 receiving space
67 rotary member
68 threading
69 seal
70 cover
71 contact socket
72 interface
73 signal line
74 sensor/stationary part
77 Filling port
79 Check valve
80 Filling port
81 insert
82 primary sealing element
83 secondary sealing element
84 screw plug
85 oil side
86 extruded double tubular profile
87 tube section
88 electronic unit
89 evaluation circuit

The invention claimed is:

1. A locking unit for a passenger restraint device of an amusement ride passenger unit, comprising:
a cylinder-piston unit having a piston rod and an electronic unit, the electronic unit comprising a sensor unit for monitoring a position of the piston rod and being configured to be switched from an operating mode to a first measuring mode for functional testing, wherein, when in the first measuring mode:
the piston rod is in a first defined reference position; and
electronic unit is configured to detect actual positions of the piston rod over a first reference period in the first measuring mode by the sensor unit and configured to compare the actual positions with a first limit position range stored in the electronic unit,
wherein the electronic unit is configured to generate a warning signal in an event of a deviation between the actual positions and the first limit position range.

2. The locking unit according to claim 1, wherein:
the electronic unit of the cylinder-piston unit is further configured to be selectively switched to a second measuring mode for functional testing, wherein, when in the second measuring mode:
the piston rod is in a second defined reference position; and
the electronic unit is configured to detect actual positions of the piston rod over a second reference period in the second measuring mode by the sensor unit and configured to compare the actual positions a second limit position range stored in the electronic unit;
wherein the electronic unit is configured to generate a warning signal in case of a deviation between the actual positions and the second limit position range; and
wherein the second reference period differs from the first reference period and/or wherein the second limit position range differs from the first limit position range.

3. The locking unit according to claim 2, wherein the first reference period is shorter than the second reference period.

4. The locking unit according to claim 2, wherein the second limit position range is smaller than the first limit position range.

5. The locking unit according to claim 2, wherein the first defined reference position and/or the second defined reference position corresponds to a minimum closing position of the passenger restraint device.

6. The locking unit according to claim 1, wherein the electronic unit further comprises a memory, the electronic unit being configured to detect actual positions of the piston rod by the sensor unit and to store the actual positions in the memory.

7. The locking unit according to claim 1, wherein the electronic unit further comprises an interface for connection to a ride control system.

8. An amusement ride passenger unit, comprising:
a passenger restraint device; and
a locking unit comprising:
a cylinder-piston unit having a piston rod coupled to the passenger restraint device and an electronic unit, the electronic unit comprising a sensor unit for monitoring a position of the piston rod and being configured to be switched from an operating mode to a first measuring mode for functional testing, wherein, when in the first measuring mode:
the piston rod is in a first defined reference position, and
the electronic unit is configured to detect actual positions of the piston rod over a first reference period in the first measuring mode by the sensor unit and configured to compare the actual positions with a first limit position range stored in the electronic unit,
wherein the electronic unit is configured to generate a warning signal in an event of a deviation between the actual positions and the first limit position range.

9. The amusement ride passenger unit according to claim 8, wherein:
the electronic unit of the cylinder-piston unit is further configured to be selectively switched to a second measuring mode for functional testing, wherein, when in the second measuring mode:
the piston rod is in a second defined reference position; and
the electronic unit is configured to detect actual positions of the piston rod over a second reference period in the second measuring mode by the sensor unit and configured to compare the actual positions a second limit position range stored in the electronic unit;
wherein the electronic unit is configured to generate a warning signal in case of a deviation between the actual positions and the second limit position range; and
wherein the second reference period differs from the first reference period and/or wherein the second limit position range differs from the first limit position range.

10. The amusement ride passenger unit according to claim 9, wherein the first reference period is shorter than the second reference period.

11. The amusement ride passenger unit according to claim 9, wherein the second limit position range is smaller than the first limit position range.

12. The amusement ride passenger unit according to claim 9, wherein the first defined reference position and/or the second defined reference position corresponds to a minimum closing position of the passenger restraint device.

13. The amusement ride passenger unit according to claim 8, wherein the electronic unit of the cylinder-piston unit further comprises a memory, the electronic unit being configured to detect actual positions of the piston rod by the sensor unit and to store the actual positions in the memory.

14. The amusement ride passenger unit according to claim 8, wherein the electronic unit of the cylinder-piston unit further comprises an interface for connection to a ride control system.

15. A method for functional testing of a locking unit, the method comprising:
moving a piston rod of a cylinder-piston unit to a first defined reference position;
switching an electronic unit of the cylinder-piston unit from an operating mode to a first measuring mode; and
when in the first measuring mode:
collecting, via the electronic unit, actual positions over a first reference period in the first measuring mode;
comparing, via the electronic unit, the actual positions with a first limit position range in the first measuring mode; and
outputting a warning signal if the actual positions deviate from the first limit position range in the first measuring mode.

16. The method according to claim 15, further comprising moving the piston rod to a position corresponding to a fully opened passenger restraint device before moving the piston rod to the first defined reference position.

17. The method according to claim 15, wherein a go signal is output by the electronic unit when the actual positions are within the first limit position range in the first measuring mode.

18. The method according to claim 15, further comprising:
moving the piston rod of the cylinder-piston unit to a second defined reference position;
switching the electronic unit of the cylinder-piston unit to a second measuring mode; and
when in the second measuring mode:
collecting, via the electronic unit, the actual positions over a second reference period;
comparing, via the electronic unit, the actual positions with a second limit position range; and
outputting a warning signal if the actual positions deviate from the second limit position range.

19. The method according to claim 18, wherein a go signal is output by the electronic unit when the actual positions are within the second limit position range in the second measuring mode.

20. The method according to claim 15, further comprising collecting, via the electronic unit, the actual positions of the piston rod at a reference period outside of the first reference period.

* * * * *